United States Patent [19]
Tucker et al.

[11] Patent Number: 5,498,476
[45] Date of Patent: Mar. 12, 1996

[54] ELECTRICALLY INSULATING FILM BACKING

[75] Inventors: Pamela S. Tucker; Eumi Pyun, both of Austin, Tex.

[73] Assignee: Minnesota Mining and Manufacturing Company, St. Paul, Minn.

[21] Appl. No.: 133,435

[22] Filed: Oct. 8, 1993

[51] Int. Cl.$^6$ .............................. B32B 7/10; C09K 21/12
[52] U.S. Cl. ..................... 428/343; 428/220; 524/140; 525/106
[58] Field of Search ...................... 428/343, 519, 428/520; 525/194, 222; 524/140

[56] References Cited

U.S. PATENT DOCUMENTS

| | | | |
|---|---|---|---|
| 3,941,859 | 3/1976 | Batiuk et al. | 260/897 B |
| 4,769,283 | 9/1988 | Sipenen et al. | 428/343 |
| 4,772,642 | 9/1988 | Staendeke | 523/205 |
| 4,808,474 | 2/1989 | Sipenen et al. | 428/343 |
| 4,868,053 | 9/1989 | Ohm et al. | 428/379 |
| 4,985,024 | 1/1991 | Sipenen | 604/389 |
| 5,017,637 | 5/1991 | Smith et al. | 524/354 |
| 5,130,357 | 7/1992 | Akitaya et al. | 524/100 |
| 5,134,012 | 7/1992 | Arakawa et al. | 428/152 |
| 5,137,937 | 8/1992 | Huggard et al. | 523/179 |
| 5,286,775 | 2/1994 | Bandyopadhyay | 524/416 |

FOREIGN PATENT DOCUMENTS

| | | | |
|---|---|---|---|
| 0274888A1 | 12/1987 | European Pat. Off. | C08K 3/00 |
| 0391336A2 | 4/1990 | European Pat. Off. | C08K 13/02 |
| 04139241 | 5/1992 | Japan | C08L 23/00 |

*Primary Examiner*—George F. Lesmes
*Assistant Examiner*—Elizabeth M. Cole
*Attorney, Agent, or Firm*—Gary L. Griswold; Walter N. Kim; Darla P. Neaveill

[57] ABSTRACT

A halogen-free, electrically insulating film comprising a resin component containing:

a) from 0 to about 40 parts of a rubber selected from EP or EPDM rubber, b) correspondingly, from about 60 to about 100 parts of an ethylene vinyl acetate polymer, c) from about 40 parts to about 150 parts ethylene diamine phosphate per 100 parts of said resin component, and d) from about 0.5 to about 5 parts of an amino-functional silane coupling agent per 100 parts resin component, wherein a nonoriented film self-extinguishes in less than about 5 seconds, has an elongation at break of at least about 200%, a dielectric strength of at least about 1200 V/Mil, and said film has a stress-strain relationship such that a curve showing a first derivative of stress versus strain is positive over the entire curve, and a curve showing a second derivative of stress versus strain is negative over more than 50% of said curve.

11 Claims, 18 Drawing Sheets

ELECTRICALLY INSULATING FILM BACKING

BACKGROUND OF THE INVENTION

1. Field of the Invention

The invention relates to electrically insulative polymeric films useful as conductive insulators and electrical tape backings that contain no halogen material.

2. Description of the Related Art

Various electrically insulative resins are known in the art. Polyolefins have been used in various resins, with and without flame retardancy in the electrical industry.

Most insulative films which are used commercially, and have both good flame retardancy and good physical properties contain some vinyl chloride. Because of the toxins produced when such compositions are burned, either accidentally or when discarded, it is desirable to reduce the halogen content as much as is possible, particularly chlorine content. However, it is difficult to attain both the flame retardancy and the physical properties such as tensile and elongation in an alternative product. This is especially true of films being used for tape backings in the electrical industry where the tapes must stretch and drape in a certain manner to be acceptable for use.

U.S. Pat. No. 5,017,637 discloses fire-retardant thermoplastic compounds that are chemically crosslinked, comprising 5–60% olefinic copolymers, 1–15% organopolysiloxane, and 20–85% flame retardant. Preferred embodiments include a copolymer, and an additional elastomer or ethylene copolymer. The preferred elastomers are EP or EPDM copolymers. Ethylene vinylacetate is also disclosed. Metal oxide hydrates are used as the fire-retardant compound.

U.S. Pat. No. 4,772,642 discloses a resin containing polyolefins, preferably polypropylene. Ammonium polyphosphate particles are used for flame retardance, and a melamine resin encapsulates the particles.

EP Patent 274,888 discloses a flame retardant halogen-free elastomer composition containing greater than 50% inorganic filler. Addition of a coupling agent is not disclosed.

EP Patent 391,336 discloses the use of a silane coupling agent and/or an olefinic synthetic rubber in a flame retardant composition of polypropylene and ammonium polyphosphate or melamine modified ammonium polyphosphate with one or more nitrogen-containing organic compounds. The organofunctional group of the silane can be vinyl, chloro, amino or mercapto. Vinyl trimethoxysilane, vinyl triethoxysilane and 3-mercaptopropyl trimethoxysilane are preferred. Compositions with an olefinic synthetic rubber and without silane are also disclosed.

JP Patent 04,139,241 discloses an olefinic resin blended with ammonium polyphosphate, a silane coupling agent, and olefinic synthetic rubber and a petroleum resin. An example of the silane is vinyl trimethoxysilane. Advantages of this compound are high electrical resistance and high bleed resistance.

U.S. Pat. No. 5,130,357 discloses a flame retardant composition containing polypropylene as the major constituent, a silane coupling agent, and/or olefinic synthetic rubbers, ammonium polyphosphate (APP) or melamine-modified APP and one or more nitrogen compounds, and optionally polyethylene resin, crosslinking agent and thiophosphate.

U.S. Pat. No. 4,808,474 and 4,769,283 disclose a pressure-sensitive adhesive tape backing having improved toughness comprising blends of crystalline isotactic polypropylene and compatible flexible polymers (in the former) or compatible ethylene containing polymers (in the latter), such polymers including EPDM and/or EVA.

U.S. Pat. No. 4,985,024 discloses a biodegradable pressure-sensitive adhesive tape backing comprising such a blend combined with an unsaturated elastomer.

U.S. Pat. No. 5,134,012 discloses a fixing tape for a disposable diaper comprising a plastics film layer, a polymer blend layer, and an adhesive layer. The plastics film layer may contain an EVA copolymer, and EP copolymer, or a combination thereof; the polymer blend layer contains two or more resins selected from EVA, EP, and polyethylene.

U.S. Pat. No. 3,941,859 discloses EPDM polymers physically blended with polyethylene and ethylene vinyl acetate copolymers having improved tensile strengths. Use as wire and cable insulation is disclosed.

However, these attempts to produce a halogen free film for the electrical industry, and especially for tape backings, have not been able to produce a halogen-free film with the required flame retardance and physical properties.

The present inventors have found that films comprising ethylene vinyl acetate (EVA) copolymers and an elastomer selected from ethylene propylene (EP) and ethylene propylene diene monomer (EPDM) rubbers and an effective amount of flame retardant phosphorous-nitrogen containing intumescent fillers and an aminofunctional silane coupling agent has tensile stress-strain behavior such that the first derivative of stress with respect to strain is positive for the entire curve, and a curve showing a second derivative of stress-strain is negative over more than 50% of the curve.

Further, such films will provide electrical tape backings having the feel, and handling properties of the most popular poly(vinyl chloride) backings with no halogen, which eliminates the release of toxic gases into the air, and also reduces negative environmental aspects from processing and disposal.

SUMMARY OF THE INVENTION

The invention provides a halogen-free, electrically insulating film comprising a resin component containing:
  a) from 0 to about 40 parts of a rubber selected from EP or EPDM rubber,
  b) correspondingly, from about 60 to about 100 parts of an ethylene vinyl acetate polymer,
  c) from about 40 parts to about 150 parts of ethylene diamine phosphate per 100 parts of said resin component, and
  d) from about 0.5 part to about 5 parts of an aminofunctional silane coupling agent, per 100 parts of said resin component, wherein a nonoriented film self-extinguishes in less than about 5 seconds, has an elongation at break of at least about 200%, a dielectric strength of at least about 1200 V/Mil, and stress-strain behavior such that a curve showing a first derivative of stress-strain is positive over the entire curve, and a curve showing a second derivative of stress-strain is negative over more than 50% of said curve.

Insulating films of the invention are suitable for use as an electrical tape backing. Preferred electrical tape backings are halogen-free electrical tape backings comprising a resin component containing:
  a) from 10 to about 40 parts of a rubber selected from EP or EPDM rubber, b) correspondingly, from about 60 to about 90 parts of an ethylene vinyl acetate polymer, c) from about 40 parts to about 150 parts of ethylene diamine phosphate per 100 parts of said resin component, and d) from about 0.5 part to about 5 parts of an amino-functional silane coupling agent, per 100 parts of said resin component, wherein a nonoriented film self-extinguishes in less than about 5 seconds, has an elongation at break of at least about 200%, a dielectric strength of at least about 1200 V/Mil, and the stress-strain behavior described above.

The invention also provides electrical tapes comprising a halogen-free backing film, comprising a resin component containing:

a) from 0 to about 40 parts of a rubber selected from EP or EPDM rubber, b) correspondingly, from about 60 to about 100 parts of an ethylene vinyl acetate polymer, c) from about 40 parts to about 150 parts of ethylene diamine phosphate per 100 parts of said resin component, and d) from about 0.5 part to about 5 parts of an amino-functional silane coupling agent, per 100 parts of said resin component, wherein said tape self-extinguishes in less than about seconds, has an elongation at break of at least about a dielectric strength of at least about 1200 V/Mil, and a stress-strain curve as described above, and an adhesive coated on one major surface of said backing.

All weights, percents, parts, and ratios herein are by weight unless specifically noted otherwise.

DETAILED DESCRIPTION OF THE INVENTION

Figure 1:
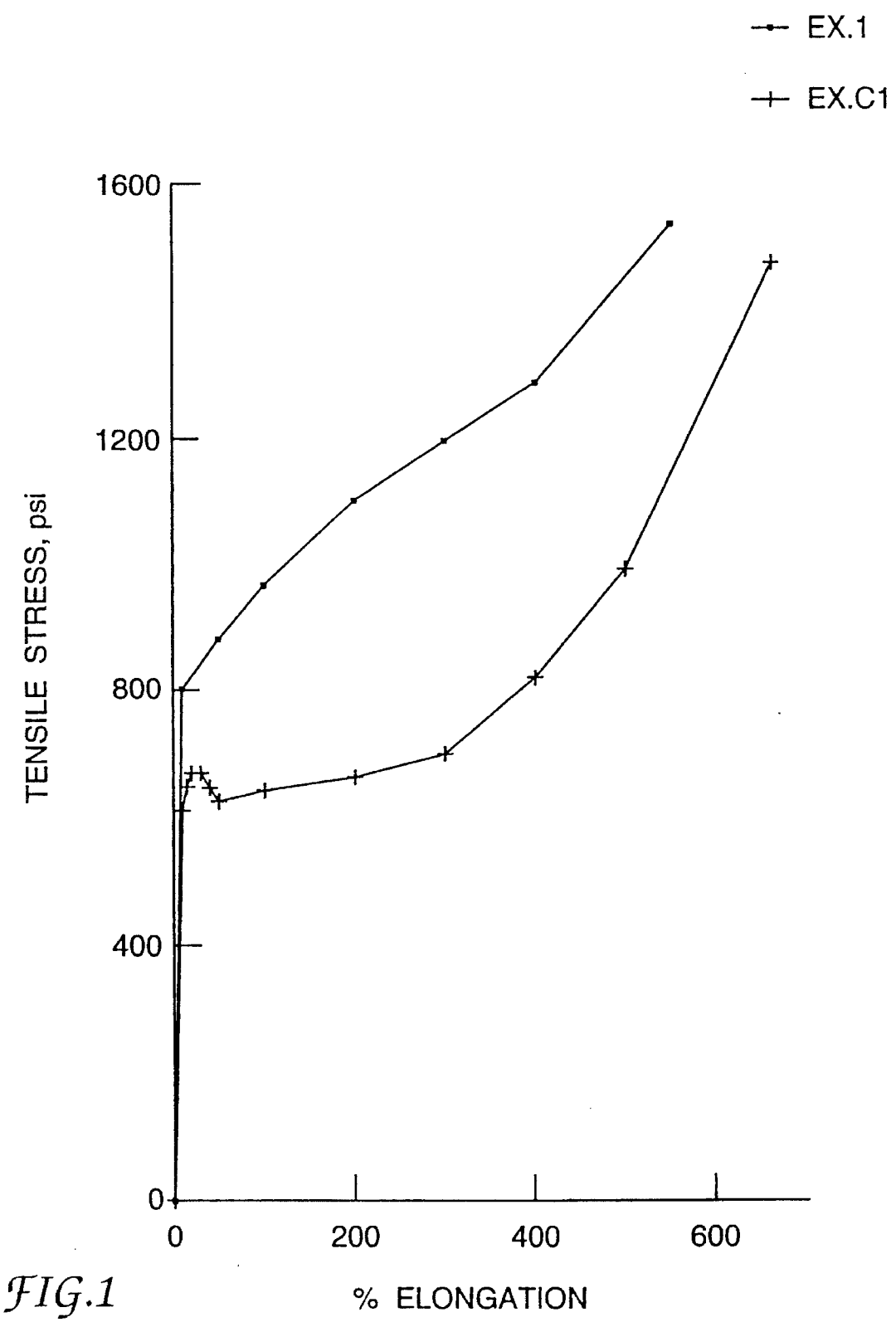
FIG. 1 shows the stress-strain curve for Example 1 and Comparative Example 1 films having thicknesses of about 150 μm to about 200μm (6-8 mils). As can be seen from the figure, there is dramatic improvement in mechanical properties for films containing the amino-functional silane. The yield point completely disappears, and the lower elongation of Example 1 is evidence of the improved adhesion between the filler and the matrix polymers.

Compositions of the invention comprise a resin component containing at least one ethylene-vinyl acetate copolymer (EVA). Ethylene vinyl acetate copolymers useful in the films of the invention contain at least about 10% by weight vinyl acetate, preferably at least 15% by weight. The resin component may contain only ethylene vinyl acetate, or it may also contain a rubber selected from EP and EPDM rubbers; when such a rubber is present, the resin component may contain as little as 60 percent EVA copolymer.

Useful rubber polymers comprise from about 50% to about 90% of ethylene, from about 10% to about 50% propylene, and from 0 to about 3% diene.

Examples of suitable diene monomers include, but are not limited to, conjugated dienes such as isoprene, butadiene, 2,3-hexadiene, and the like, and nonconjugated dienes such as 1,4-pentadiene, 1,5-hexadiene, 2,5-dimethyl-1,5 hexadiene, 1,4-hexadiene and the like; cyclic dienes such as cyclopentadiene, cyclohexadiene, dicyclopentadiene, 3-methyltricyclo(5,2,1)-3,8-decadiene, and the like, and alkenyl norborenes such as 5-ethylidene-2-norborene, 2-methallyl-5-norborene, and the like. These polymers are easily prepared by well know solution or suspension polymerization techniques.

Insulating films of the composition comprise an effective amount of ethylene diamine phosphate as the flame-retardant agent, such as that available commercially from Albright & Wilson.

Insulating films of the invention also comprise an amino silane coupling agent. Useful amino silanes include, but are not limited to, N-beta-(amino-ethyl) gamma-aminopropyl trimethoxy silane and aminopropyl triethyoxy silane and trimethoxy silane. Films of the invention contain from about 0.05 part to about 5 parts amino-functional silane coupling agent, preferably from about 0.1 part to about 2 parts, per 100 parts resin component.

Films of the invention may also comprise conventional additives such as reinforcing fillers, pigments such as carbon black, and $TiO_2$, dyes, ultraviolet stabilizers, plasticizers, fungicides, extenders, waxes, antioxidants, and the like, in amounts known to those skilled in the art.

Other useful fillers include fumed silica, calcium and magnesium carbonates, calcium and barium sulfates, aluminum silicates, and the like, which may be included in small amounts, such that they do not interfere with the physical properties required.

Films of the invention are useful as insulative wire and pipe coatings, as insulative backings for multilayer films, and especially, as electrical tape backings. Such films would also be useful for various molded and extruded items such as shoe soles, shower curtains, kitchen ware and the like.

The films of the invention are made by physically mixing the rubber, the ethylene vinyl acetate copolymer, and the ethylene diamine phosphate, along with any additives in a mill, mixer or extruder. The mixing conditions are not critical, and such processes are well known to one skilled in the art.

Films of the invention have a stress-stain behavior such that a curve of the first derivative stress-strain relationship has a wholly positive slope. This is surprising, as most olefin-based films have at least some portion of the slope which is negative. Further, a curve of the second derivative shows that it is mostly negative. That means that these films do not have an inflection point below about 200% elongation. Electrical tapes backed with films with these characteristics demonstrate a vastly improved handling characteristic over the prior art halogen-free films; i.e., they approximate the stretch and "drape" characteristics of vinyl chloride backed electrical tapes. This is extremely critical for proper insulation and sealing of repaired cables and connections, as well as for acceptance by persons skilled in electrical maintenance and repair.

Tapes comprising backings of the invention have an improved low temperature performance as compared to prior art poly(vinyl chloride) backings. PVC film becomes very stiff, exhibits a yield point and is brittle at the low temperature. The filled blend retains good elongation and mechanical properties even at temperatures of about −20° C. Further, vinyl does not have a stress-strain curve with a wholly positive slope at such low temperatures, whereas films of the invention do have a stress-strain curve which retains a positive slope even at −20° C.

Electrical tapes of the invention have at least one side of the film backing coated with an adhesive. The adhesive may be any conventional adhesive known in the art, including but not limited to, natural rubber, thermoplastic elastomers, such as block copolymers, thermoset adhesives, acrylic adhesives, silicone adhesives and the like. The adhesive may further comprise such conventional additives as tackifiers, plasticizers, pigments, fillers, initiators, crosslinking agents, and the like, as desired.

The following examples are meant to be illustrative and should not be construed as limiting the scope of the invention, which is defined only by the claims. One skilled in the art would be able to create variations which would be within the spirit of the invention. Comparative examples are indicated by the use of the letter "C" in front of the example number.

TEST METHODS

FLAME RETARDANCE

Flame retardance was tested by the ASTM D1000 test method. This test involves wrapping a film strip around a wire with a 50% overlap and repeating with another film strip in the opposite direction. The wrapped wire is exposed to an open flame for 30 seconds. The flame is removed and the burn time of the film is measured. Desirable flame retardance would be exhibited by a material that does not begin to burn, or self extinguishes in less than 5 seconds.

TENSILE TEST

Tensile strength was tested by the ASTM D1000 test method.

| Glossary of Materials | |
|---|---|
| Elvax ™ 470 | poly(ethylene vinyl acetate) copolymer; 18% vinyl acetate; available from DuPont |
| Epsyn ™ 7506 | ethylene-propylene terpolymer; 77% ethylene; 5.5 C/100 C unsaturated; available from Copolymer |

-continued

| Glossary of Materials | |
|---|---|
| LDPE | low density polyethylene 1017; available from Chevron |
| PP-PB | amorphous polypropylene-polybutylene copolymer; available from Eastman |
| LDX 314 | experimental ethylene methyl acrylate-acrylic acid terpolymer; available from Exxon |
| EVOH 27 | poly(ethylene vinyl alcohol); 27% vinyl alcohol; available from EVALCO |
| IFR 10 | ammonium polyphosphate based flame retardant filler; available from Hoechst-Celanese |
| IFR 23 | ammonium polyphosphate flame retardant filler; available from Hoechst-Celanese |
| Phoschek P40 | ammonium polyphosphate based flame retardant filler; available from Monsanto |
| Exolit 422 | ammonium polyphosphate based flame retardant filler; available from Hoechst-Celanese |
| EDAP | ethylene diamine phosphate; available from Albright & Wilson |
| DE83R | decabromodiphenyl oxide flame retardant filler; available from Great Lakes Chem. Corp |
| Solem 932 | alumina trihydrate; available from J.M. Huber |
| EVA85H | antimony trioxide concentrate in poly(ethylene vinyl acetate); available from Laurel |
| A0750 | aminopropyltriethoxy silane; available from Union Carbide |
| A151 | vinyltriethoxy silane; available from Union Carbide |
| A1100 | aminopropyltrimethoxy silane; available from Union Carbide |
| A1120 | N-beta-(aminoethyl)-gamma-aminopropyltrimethoxy silane; available from-Union Carbide |
| A1130 | triamino-functional silane; available from Union Carbide |
| A174 | gamma-methacryloxypropyltrimethoxy silane; available from Union Carbide |
| M8500 | 3-mercaptopropyltrimethoxy silane; available from Huls Petrarch |
| Z6032 | N-[2(vinyl benzyl amino)-ethyl]-3-aminopropyltrimethoxy silane; available from Dow Corning |
| Lica 44 | neopentyl(diallyl)oxy, tri(N-ethylenediamino)ethyl titanate; available from Kenrich |
| Lica 97 | neopentyl(diallyl)oxy, tri(m-amino)phenyl titanate; available from Kenrich |
| L44/H | 2,2(bis-2-propenolatomethyl)butanlato, tri(N-ethylaminoethylamino) titanate; available from Kenrich |
| NZ44/H | 2,2(bis-2-propenolatomethyl)butanlato, tri(N-ethylaminoethylamino) zirconate; available from Kenrich |
| L97/H | 2,2(bis-2-propenolatomethyl)butanlato, tri(m-amino) phenyl titanate; available from Kenrich |
| NZ97/H | 2,2(bis-2-propenolatomethyl)butanlato, tri(m-amino) phenyl zirconate; Kenrich |
| Irganox 1010 | hindered phenolic antioxidant; available from Ciba Geigy |
| Irganox 1035 | hindered phenolic antioxidant; available from Ciba Geigy |

EXAMPLES

Examples of typical polymer blend compositions with and without the amino-functional silane coupling agent are provided by the formulations in Table 1. Compositions were mixed in a Brabender™ rheometer using a small batch mixing head with high shear paddles at 105° C. for 5 minutes until a uniform dispersion of the polymer and filler components was achieved. Blends were pressed between heated platens to form films.

TABLE 1

| Materials | Example 1 (Parts) | Example C1 |
| --- | --- | --- |
| Elvax ™ 470 | 80 | 80 |
| Epsyn ™ 7506 | 20 | 20 |
| EDAP | 50 | 50 |
| A0750 | 0.15 | — |
| Irganox ™ 1010 | 0.15 | 0.15 |

The tensile properties of Example 1 and C1 films having a thickness of about 150 μm to about 200μm (6–8 mils) of Examples 1 and C1 are depicted in FIG. 1. As can be seen from the figure, there is dramatic improvement in mechanical properties for films containing the amino-functional silane. The yield point completely disappears, and the lower elongation of Example 1 is evidence of the improved adhesion between the filler and the matrix polymers.

The shape of the curve for the composition of Example 1 more closely resembles the behavior of plasticized poly(vinyl chloride) (PVC) which is highly desirable for films used in tapes for the electrical industry.

EXAMPLES C2 and 2–4

Figure 2:
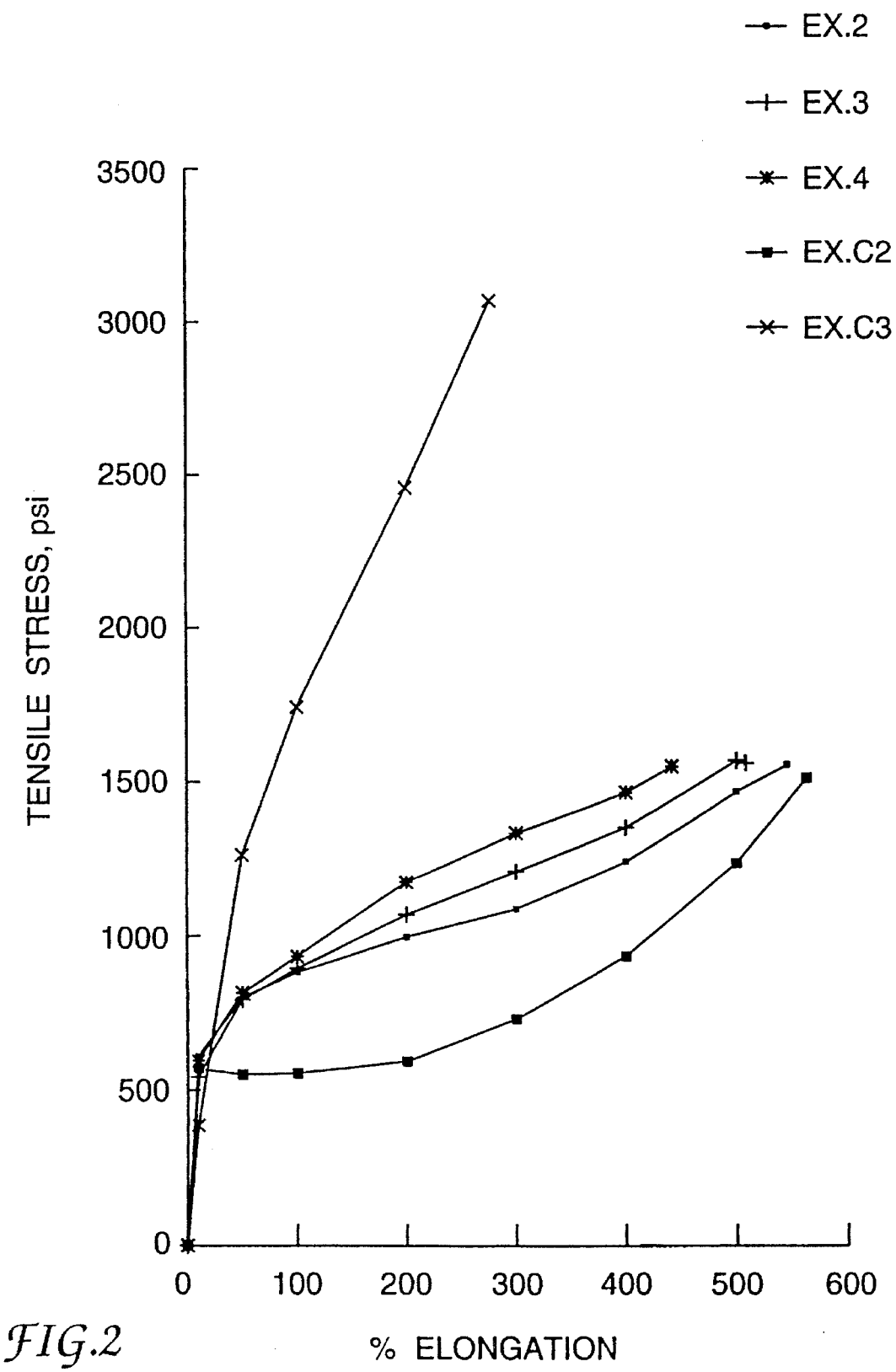
FIG. 2 shows the stress strain curves for films having various amounts of amino-functional silane.

Blends were prepared in the same manner as described previously except containing varying amounts of amino-functional silane. FIG. 2 demonstrates the effect of the amount of amino-functional silane on the mechanical properties for the following compositions listed in Table 2.

TABLE 2

| Material | Ex. 2 | Ex. 3 | Ex. 4 | Ex. C2 |
| --- | --- | --- | --- | --- |
| Elvax ™ 470 | 80 | 80 | 80 | 80 |
| Epsyn ™ 7506 | 20 | 20 | 20 | 20 |
| EDAP | 50 | 50 | 50 | 50 |
| A1100 | 0.3 | 0.6 | 1.0 | 0 |
| Irganox ™ 1010 | 0.15 | 0.15 | 0.15 | 0.15 |

As addition of amino-functional silane increases, the shape of the stress-strain curve remains approximately the same although slight increases in tensile strength and reductions in ultimate elongation occur with higher silane contents. The stress-strain behavior of plasticized vinyl (PVC) film is shown for comparison of the relative shapes of the curves (Example C3).

Compositions for several blends containing a phosphorous-nitrogen flame retardant (EDAP) and various coupling agents including a composition with no coupling agent were hot melt mixed and pressed into films as described previously and are listed in Table 3.

EXAMPLES 3–5 AND C3–C5

These examples were made similar to Example 1, i.e., with 80 parts Elvax™ 470, 20 parts Epsyn™ 7506, 50 parts EDAP, and 0.15 part Irganox™1010. However, the types of silane coupling agent were varied. The Example numbers and types of silane are listed below in Table 3.

TABLE 3

| Silane | Ex 5 | Ex 6 | Ex 7 | Ex C4 | Ex C5 | Ex C6 |
| --- | --- | --- | --- | --- | --- | --- |
| A1100 | 1 | | | | | |
| A1120 | | 1 | | | | |
| A1130 | | | 1 | | | |
| A174 | | | | 1 | | |
| M8500 | | | | | 1 | |
| Z6032 | | | | | | 1 |

Figure 3:
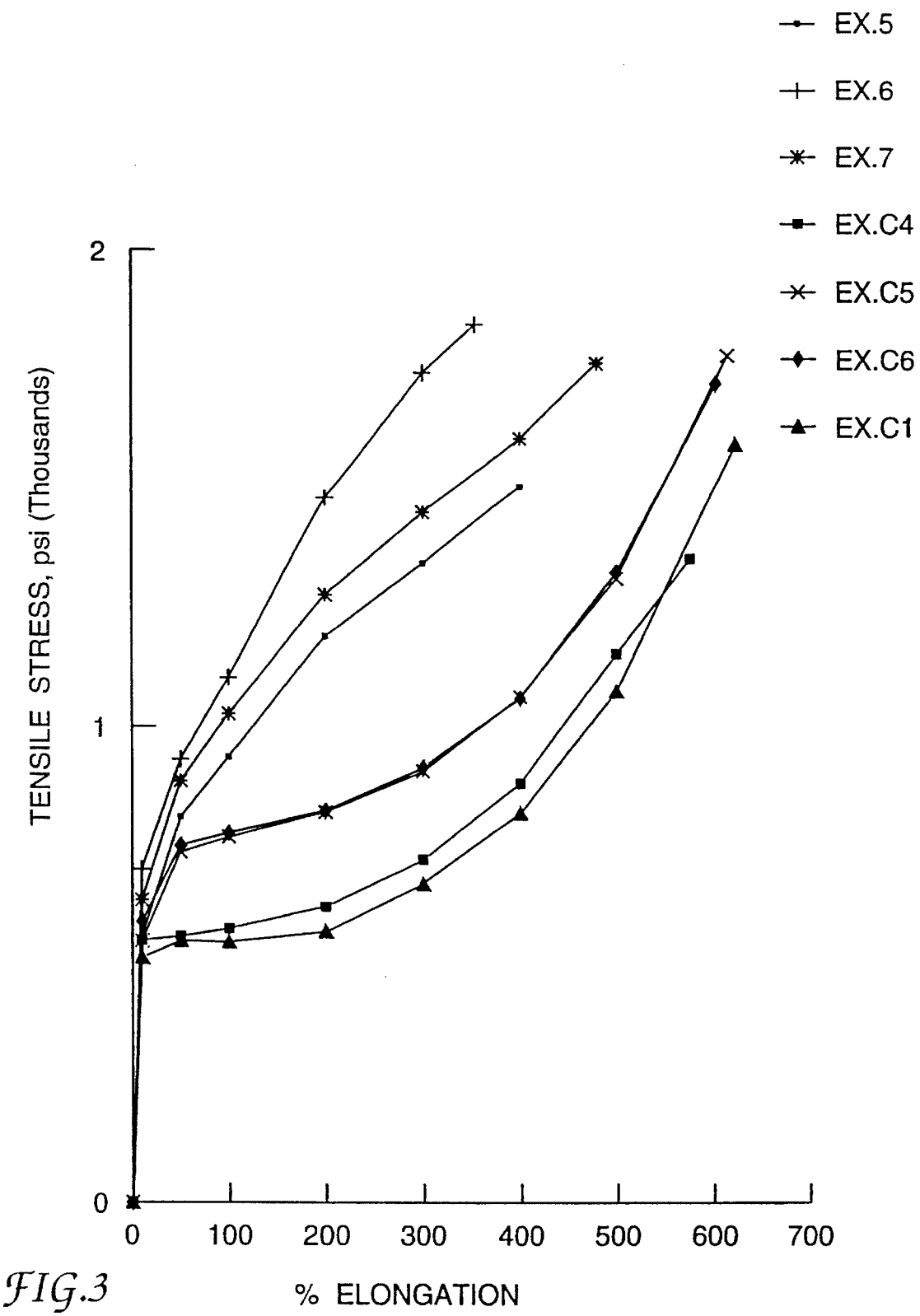
FIG. 3 shows stress-strain curves for films wherein the type of silane is varied. Films containing the amino functional silanes exhibit a dramatically changed curve as compared to vinyl functional silanes, benzyl mercapto functional silanes, and methacryl functional silanes, demonstrating the reinforcing effect of the amino functional silanes.

Tensile stress-strain curves are shown in FIG. 3 for films of the compositions listed in Table 3 and film C1 shown in Table 1. The amino-functional silanes change the shape of the stress-strain curve dramatically compared to the vinyl, benzyl, mercapto and methacryl functional silanes. The Z6032 silane does contain an amino functional group, but it is centrally located within the molecule and, for stearic considerations, is not freely accessible to interact with the polymer. The primary functionality of this silane is vinyl. These non-amino silanes, including the Z6032, may have some reinforcing effect over compositions without silane, but not nearly the effect obtained with amino-functional silane coupling agents.

The dry and wet dielectric properties and the flame retardance of these compositions with the addition of various coupling agents and without coupling agent are listed in Table 4.

TABLE 4

| EXAMPLE | BURN TIME Seconds | DIELECTRIC STRENGTH (V/mil) DRY | WET |
| --- | --- | --- | --- |
| 5 | 1 | 1653 | 537 |
| 6 | 1 | 1534 | 518 |
| 7 | 1 | 1361 | 541 |
| C4 | 1 | 1756 | 535 |
| C5 | 1 | 1856 | 542 |
| C6 | 1 | 1589 | 536 |
| C1 | 1 | 1327 | 522 |

The dielectric properties of compositions using most types of coupling agents are improved over compositions without coupling agent. No advantage of amino-functional silanes, compared to other silanes, is evident here. Flame retardant properties are not noticeably affected by the addition of different types of silane coupling agents. Amino-silane coupling agents perform similarly to other silanes in dielectric properties and flammability tests of these compounds.

Figure 4:
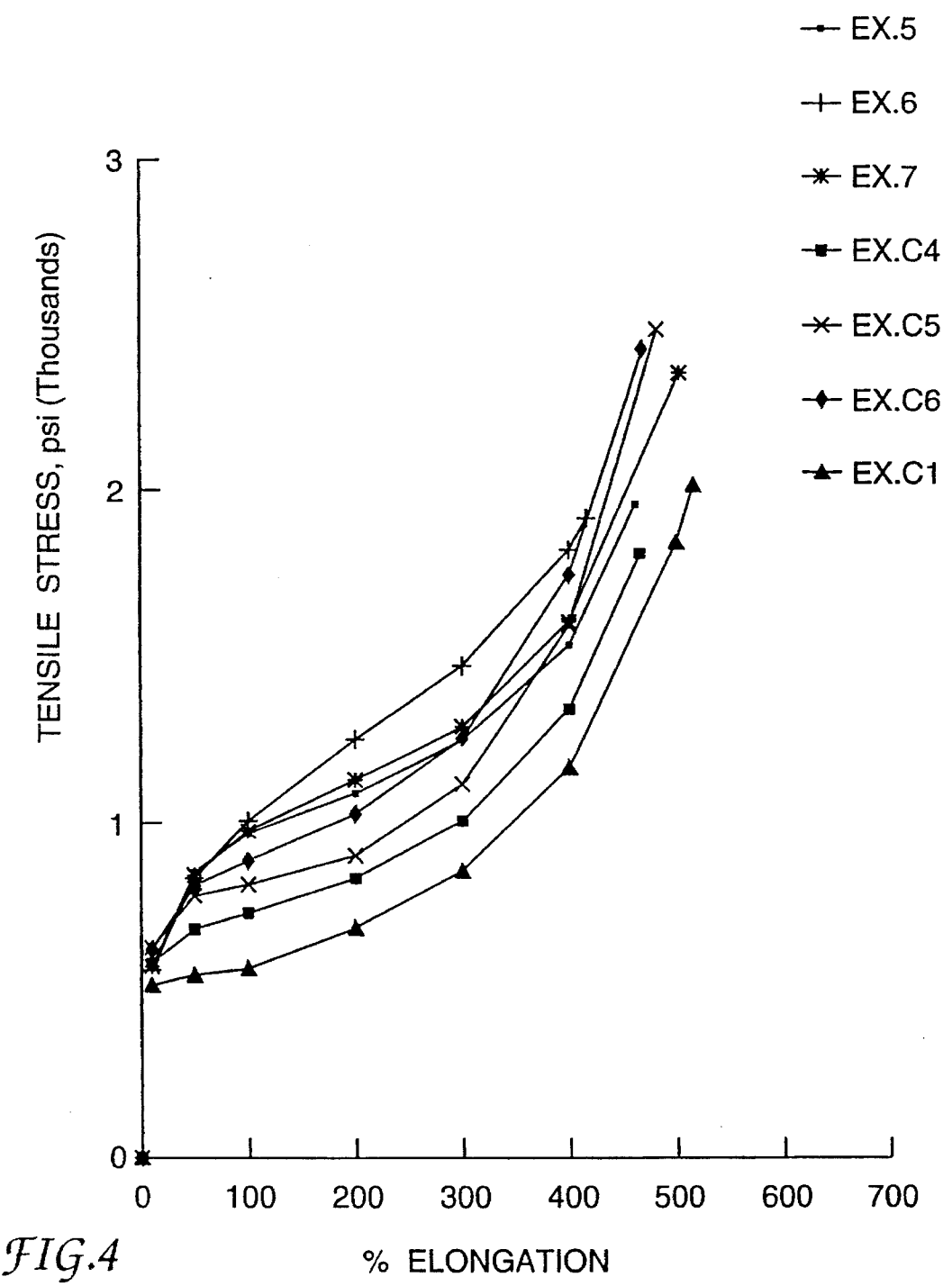
FIG. 4 shows the stress-strain curves for electron beam irradiated films. Flame retardant properties are not noticeably effected by the addition of differing types of silane coupling agents.

Films of the compositions listed in Table 3 were exposed to electron beam radiation at a dose of 15 megarads. Tensile properties of irradiated samples are shown in FIG. 4 and burn time and dielectric strength of irradiated samples are shown in Table 5.

TABLE 5

| EXAMPLE | BURN TIME | DIELECTRIC STRENGTH (V/mil) DRY | WET |
| --- | --- | --- | --- |
| 5 | 1 | 1597 | 527 |
| 6 | 2 | 1836 | 542 |
| 7 | 2 | 1259 | 532 |

TABLE 5-continued

| EXAMPLE | BURN TIME | DIELECTRIC STRENGTH (V/mil) | |
|---|---|---|---|
| | | DRY | WET |
| C4 | 1 | 1940 | 523 |
| C5 | 1 | 1654 | 515 |
| C6 | 2 | 1359 | 543 |
| C1 | 1 | 1079 | 525 |

Irradiation of these compositions changes the tensile properties by crosslinking the polymeric matrix, but the effect of the amino-functional silane on the tensile properties is still obvious compared to irradiated compositions containing no coupling agent. Although the curves are shifted together upon irradiation, close examination reveals that blends with non-amino functional silanes have an inflection point, a change from negative to positive second derivative of stress with respect to strain, below about 200% elongation.

Blends containing amino-functional silane exhibit an inflection point after irradiation, which is characteristic of crosslinked materials, but this occurs at elongations higher than 200%. Tensile properties of irradiated films containing non-amino functional silanes do not show the reinforcement seen with amino-functional silane coupling agents.

Irradiated samples containing silane coupling agents demonstrate improvements in dry dielectric strength over samples without silane coupling agents, and amino silanes appear to perform similarly to other silanes, as was noted in non-irradiated samples. Irradiation has no obvious effect on flame retardance or dielectric properties.

Figure 5:
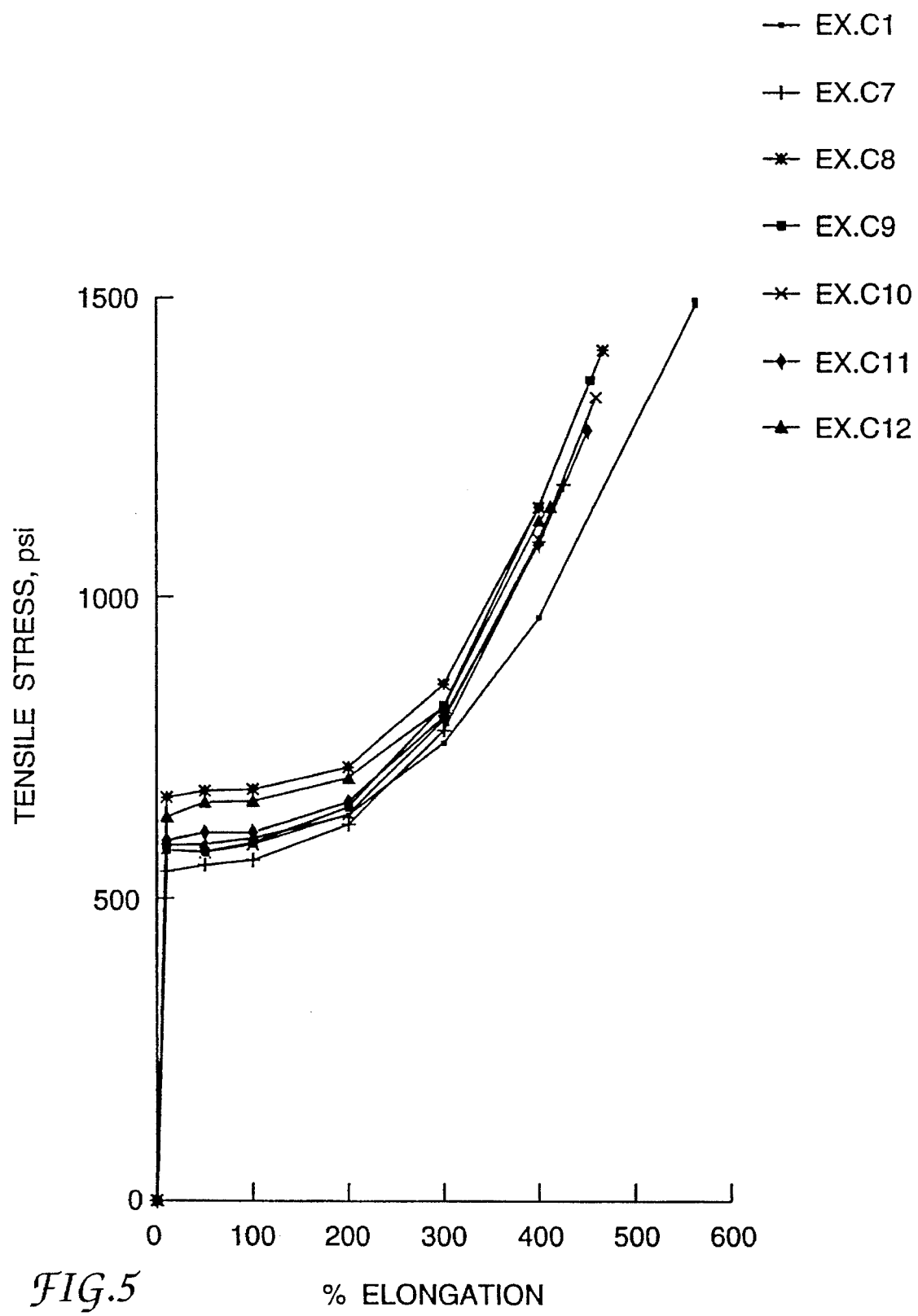
FIG. 5 shows the stress-strain curves of non-silane coupling agents which contain an amino functional group, i.e., amino-functional titanates and zirconates.
Figure 6A:
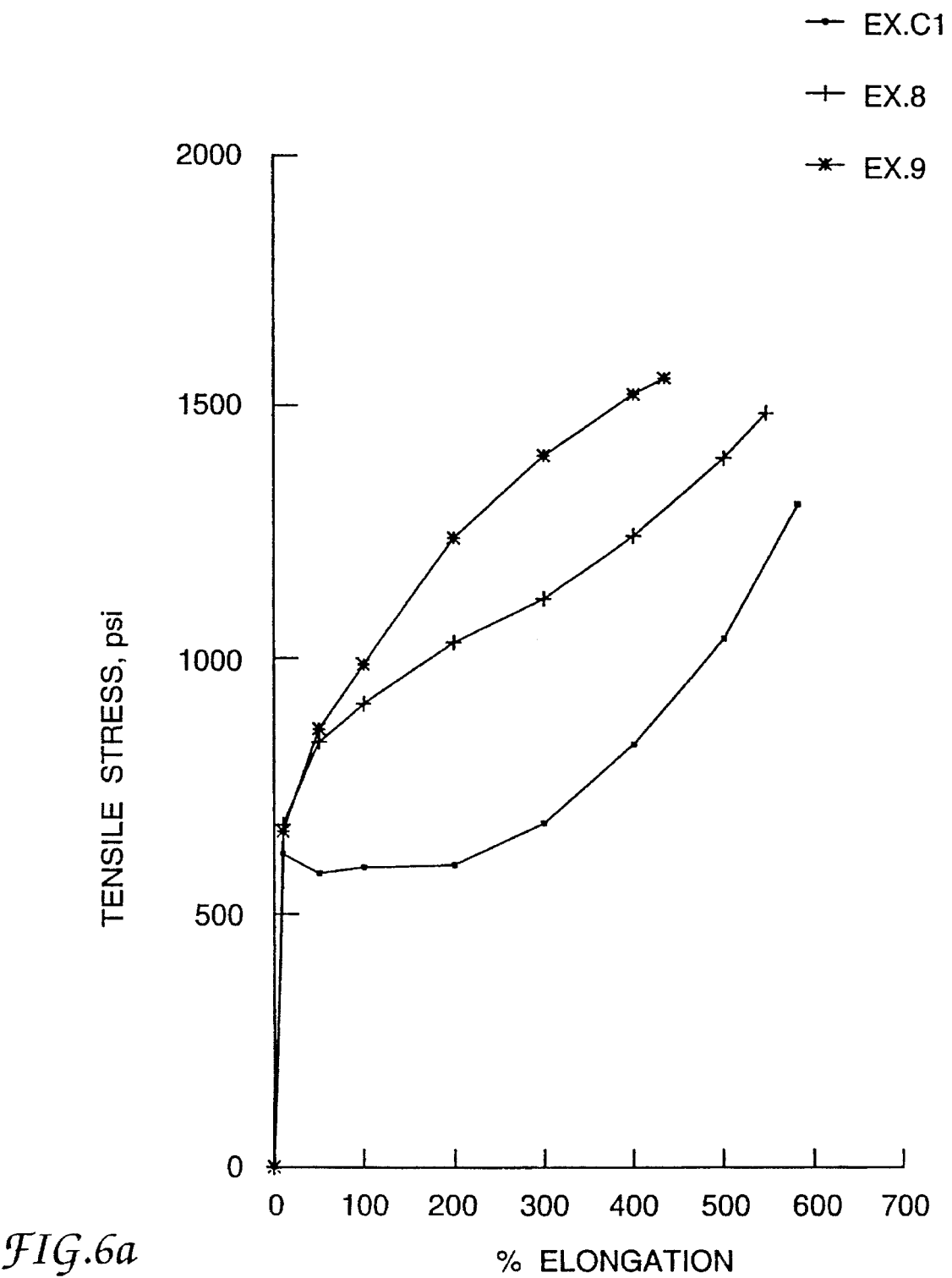
FIG. 6a–6f shows the stress strain curves of the effects of no silane, and two different levels of amino silane with various flame retardant fillers.
Figure 6B:
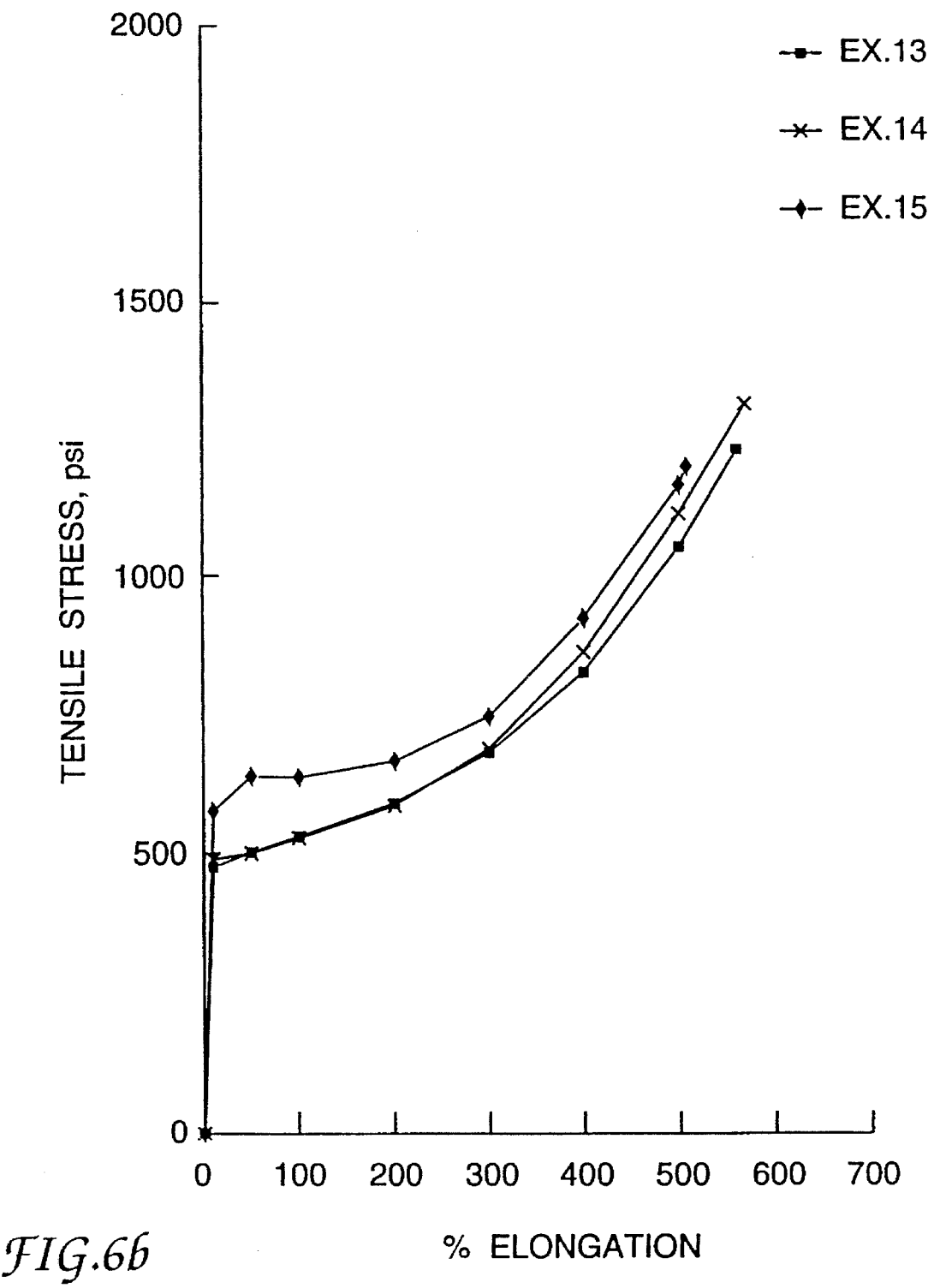
Figure 6C:
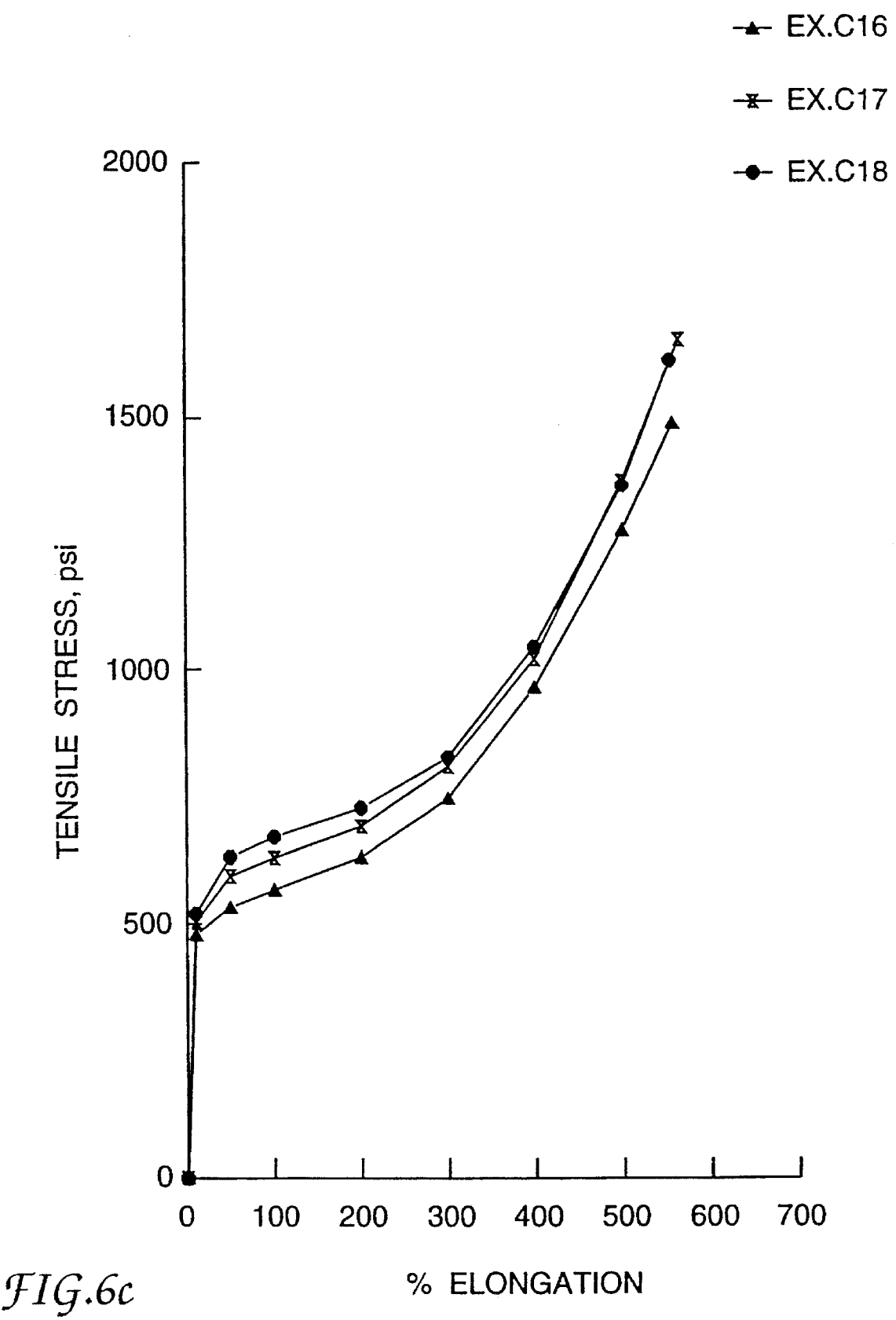
Figure 6D:
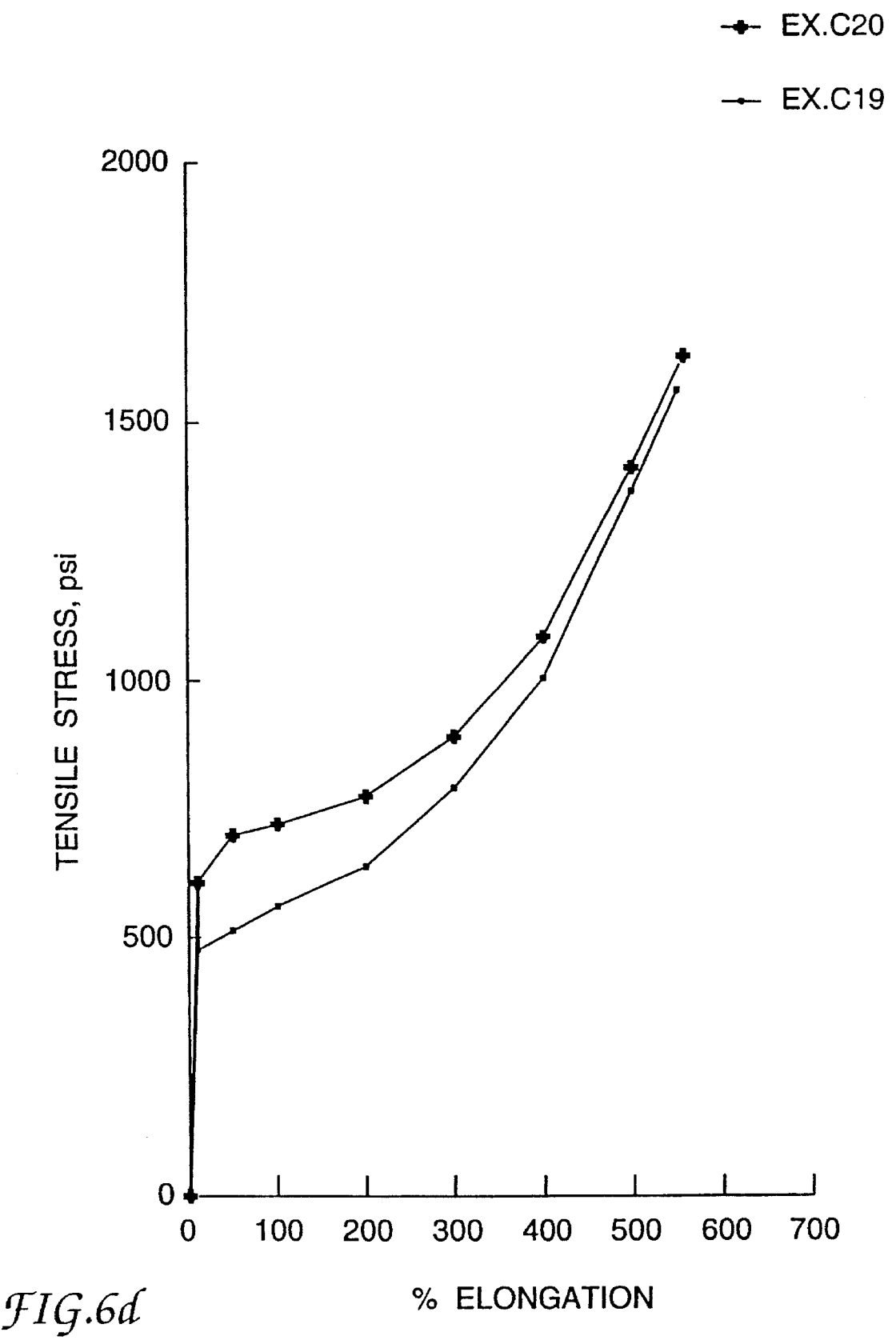
Figure 6E:
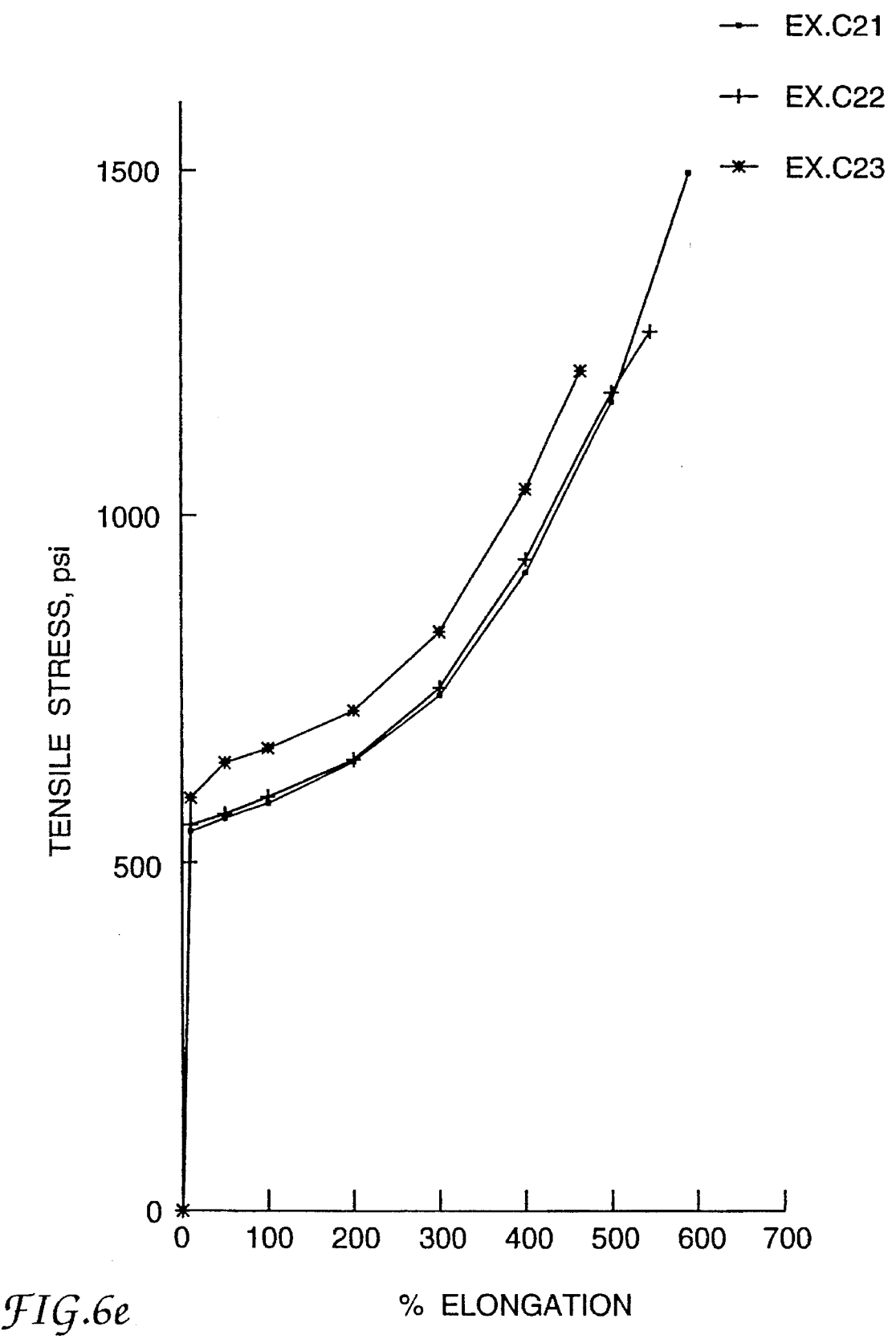
Figure 6F:
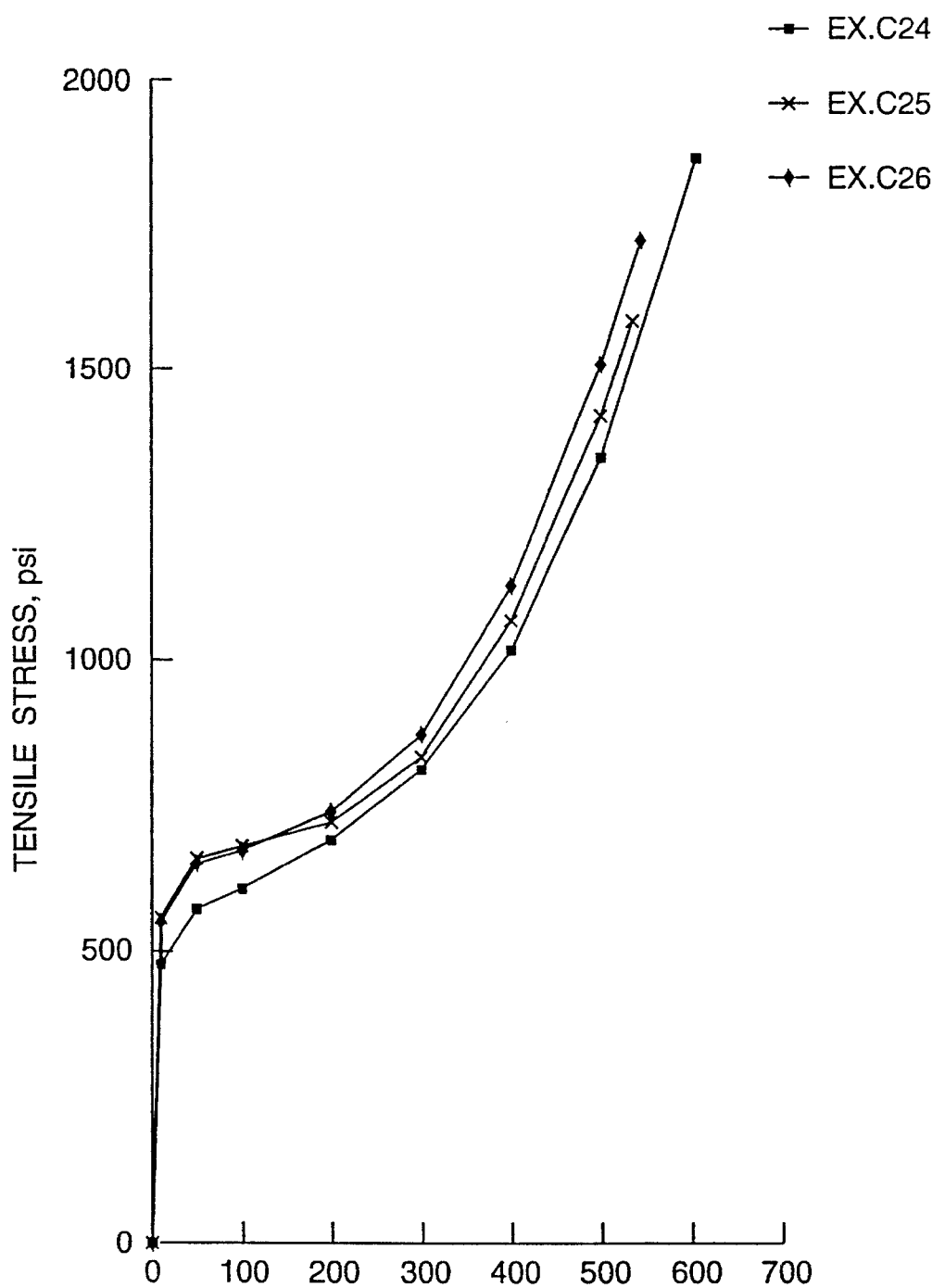

Coupling agents with amino-functionality, other than silane coupling agents, do not demonstrate the dramatic improvement in tensile stress-strain behavior. Blends containing amino-functional titanates and zirconates are described in Table 6 and tensile properties of hot melt mixed and pressed films are shown in FIG. 5.

COMPARATIVE EXAMPLES C7–C12

These Examples were made similar to Example C1, i.e., with 80 parts Elvax™ 470, 20 parts Epsyn™ 7506, 50 parts EDAP, and 0.15 part Irganox™ 1010. However, these examples use amino-functional titanates and zirconates in place of amino functional silanes of compositions of the invention as coupling agents. The coupling agents are listed for each Example in Table 6.

TABLE 6

| Ex. No./ Ingred | Ex C1 | Ex C7 | Ex C8 | Ex C9 | Ex C10 | Ex C11 | Ex C12 |
|---|---|---|---|---|---|---|---|
| LICA 44 | 0 | 0.3 | | | | | |
| LICA 97 | | | 0.3 | | | | |
| L44/H | | | | 0.3 | | | |

TABLE 6-continued

| Ex. No./ Ingred | Ex C1 | Ex C7 | Ex C8 | Ex C9 | Ex C10 | Ex C11 | Ex C12 |
|---|---|---|---|---|---|---|---|
| NZ44/H | | | | | 0.3 | | |
| H | | | | | | 0.3 | |
| NZ97/H | | | | | | | 0.3 |

Addition of these non-silane amino-functional coupling agents reduces the elongation of the compositions and increases the tensile values somewhat, similar to non-amino silane coupling agents, but does not dramatically improve the tensile values or the shape of the stress-strain curve as does the amino functional silane coupling agents.

COMPARATIVE EXAMPLES C13–C26 AND EXAMPLES 8 AND 9

Compositions containing various P-N flame retardant fillers are listed in Table 7. The effect of 0.3 phr and 1.0 phr of an amino-functional silane on these compositions is also shown in FIG. 6. EDAP is the only flame retardant that demonstrates the desired improvement in stress-strain properties. The other systems show very little change in tensile stress-strain properties with the addition of amino-functional silane coupling agent.

Most of the commercial phosphorous-nitrogen type flame retardants (including those tested) are composed primarily of ammonium polyphosphate. EDAP is an exception. EDAP has tri-hydroxyl functionality that imparts some level of acidity to this filler. Without wishing to be bound by theory, it is believed that this causes the EDAP to be more reactive than the APP compounds with the hydrolyzable groups of the silane. Infrared analysis was conducted on samples of EDAP, EDAP in EVA/EPDM and EDAP in EVA/EPDM with aminofunctional silane. The spectra indicate no chemical reaction between the EVA and the EDAP with or without the amino-functional silane. Hydrogen bonding would not be detectible as a chemical reaction.

COMPARATIVE EXAMPLES C27–C36

Figure 7A:
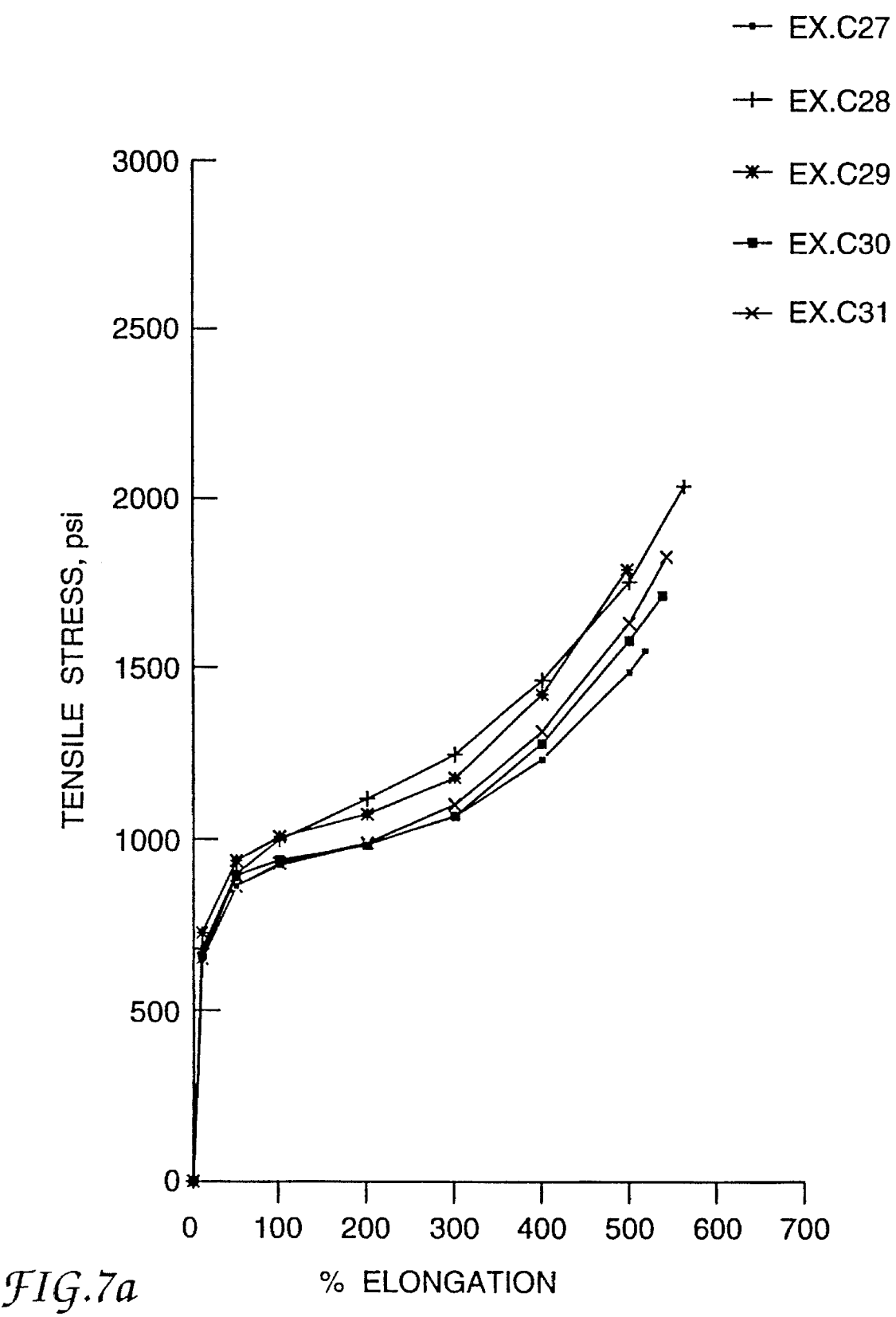
FIG. 7a–7b shows the stress-strain curve of compositions having non-phosphorous-nitrogen (P-N) type flame retardants.
Figure 7B:
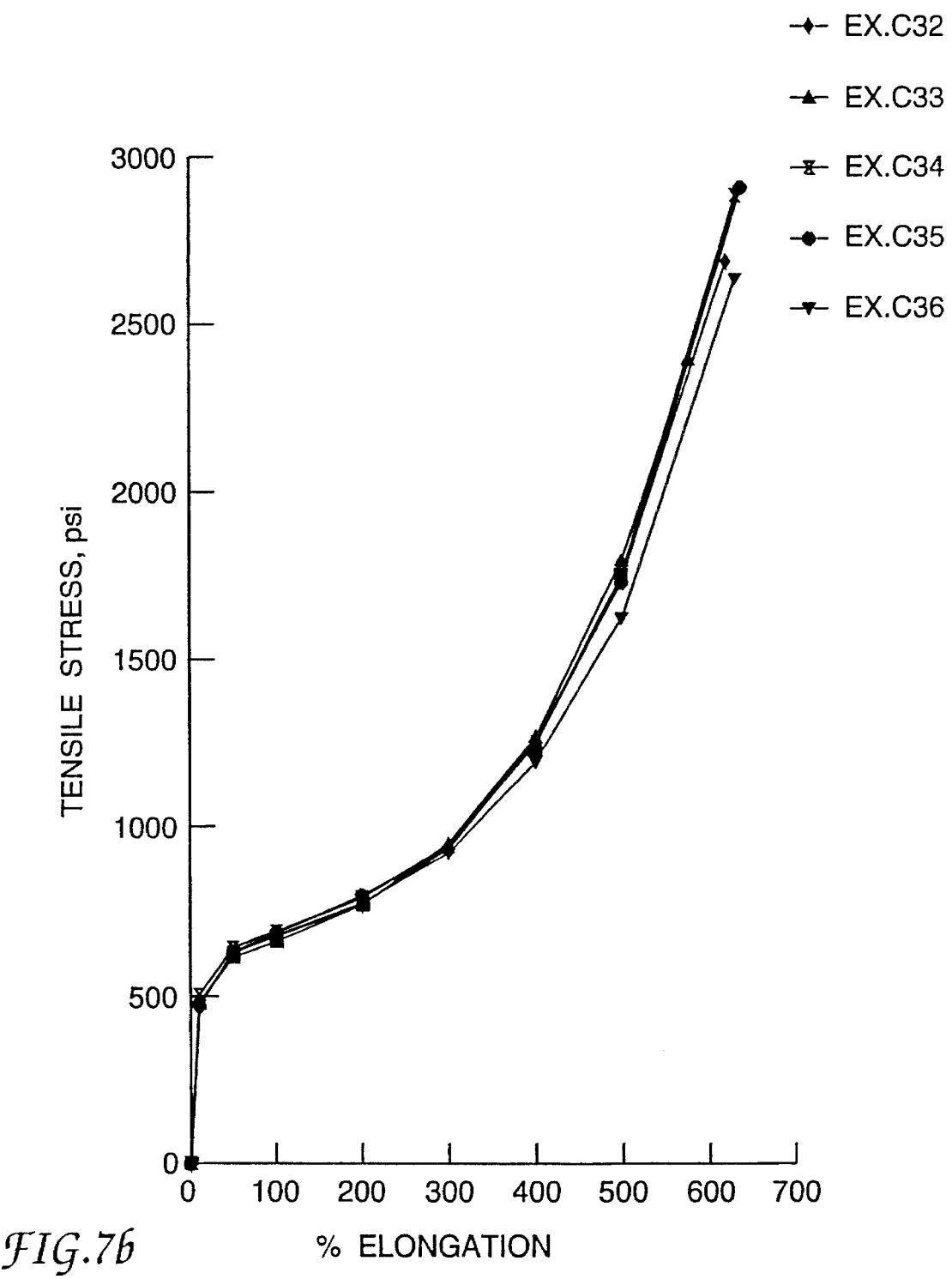
Figure 8A:
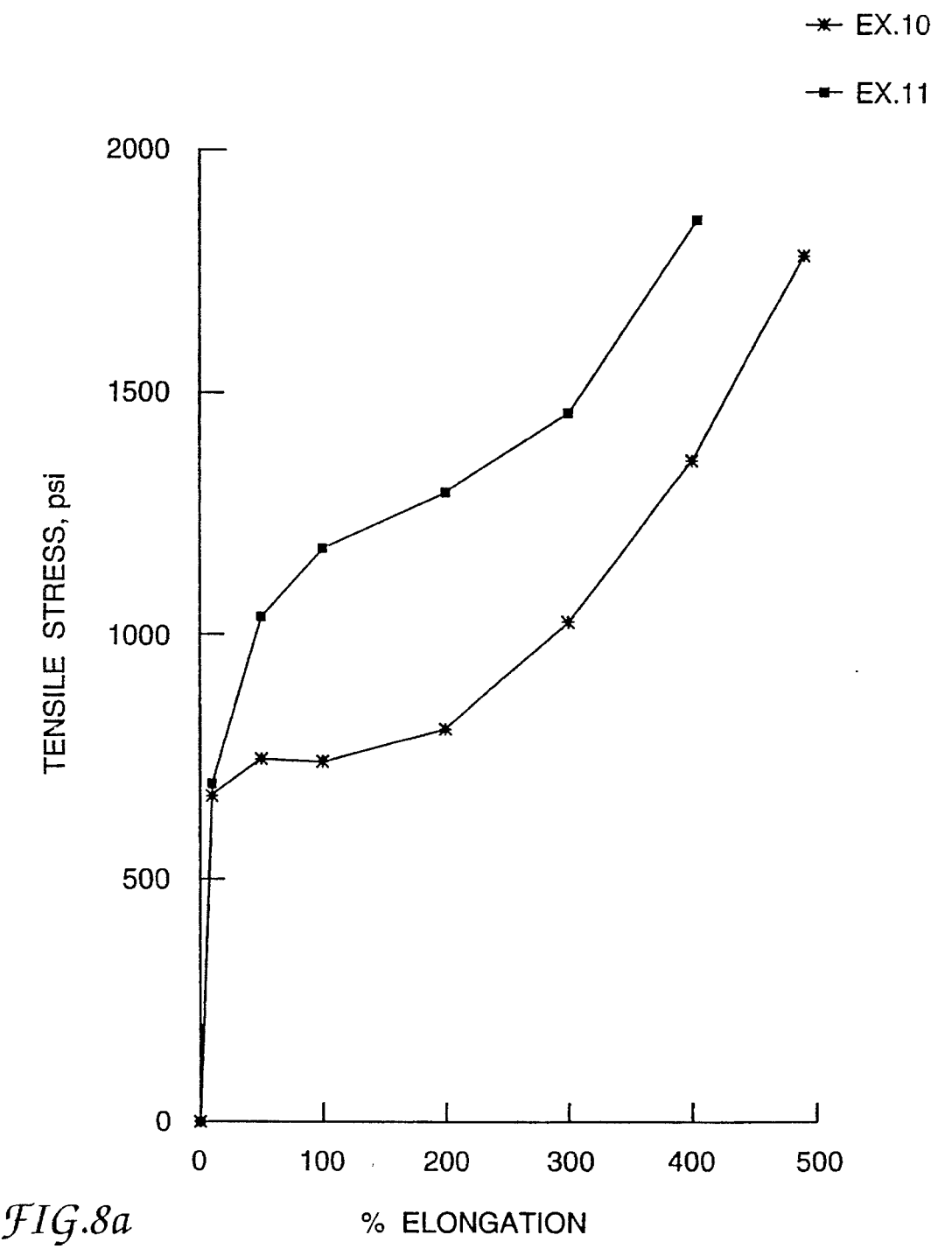
FIG. 8a–8d shows the stress-strain curves of various matrix polymers with P-N type flame retardants of this invention.
Figure 8B:
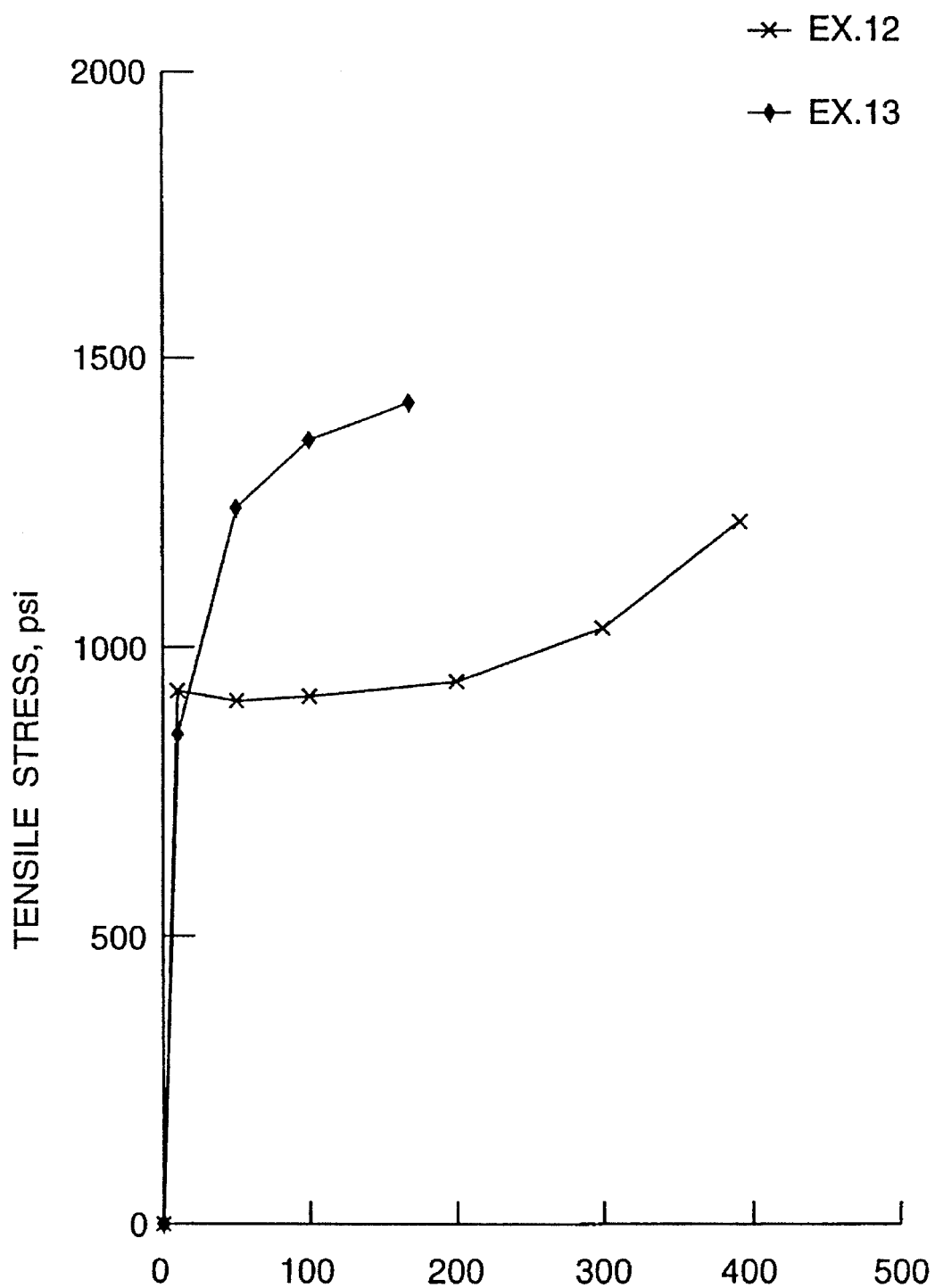
Figure 8C:
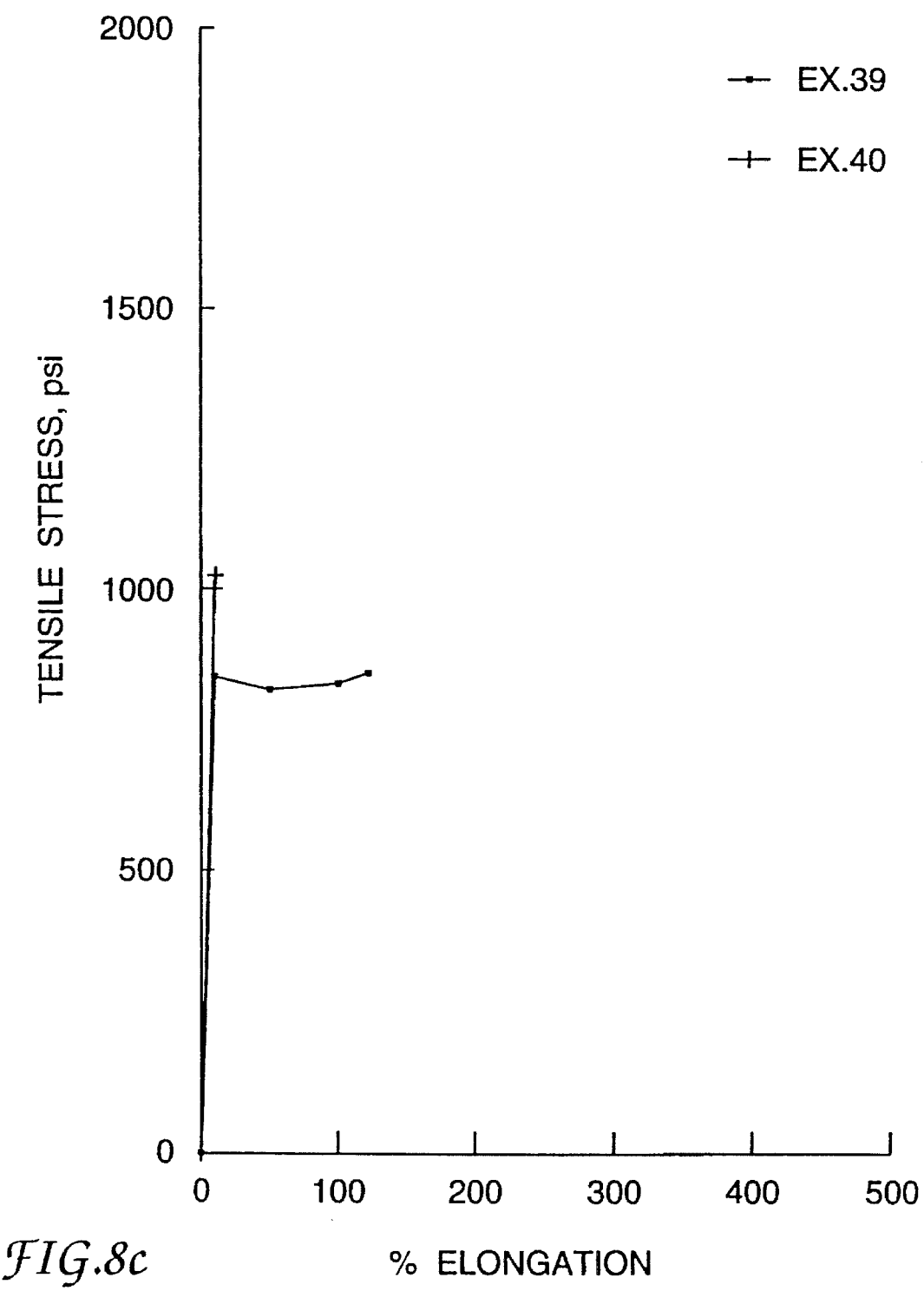
Figure 8D:
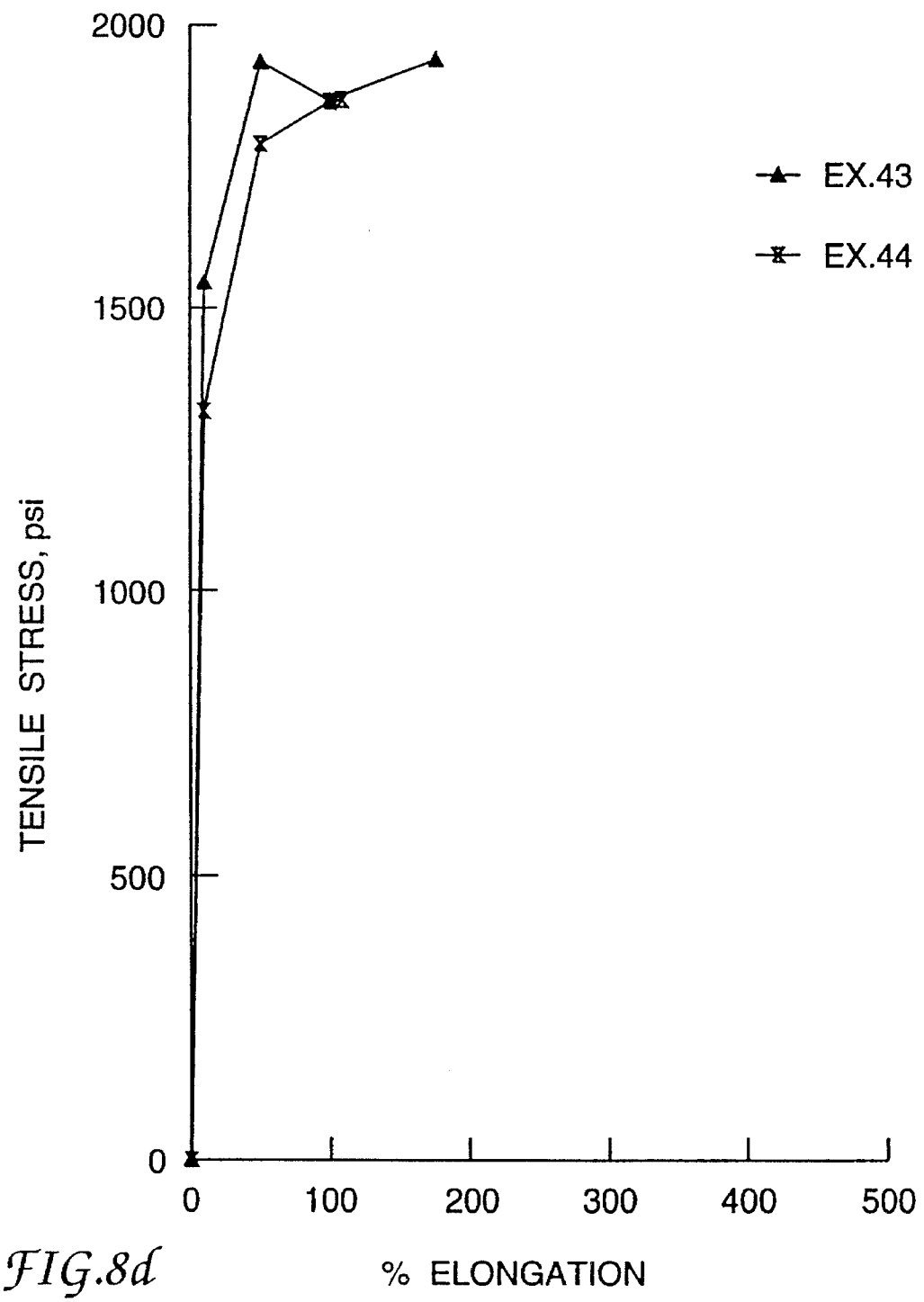

Films of flame retarded compositions that do not contain P-N type flame retardants were prepared that contain various types of silane coupling agents. These are described in Table 8 and the tensile properties of these films are shown in FIG. 7. The shape of the stress-strain curve is not affected by the different type of functionality of the silane coupling agent, although the addition of a silane of any type provides a small improvement in tensile properties when compared with the properties of compositions containing no silane coupling agent.

TABLE 7

| Example No. Ingredients | Elvax ™ 470 | Epsyn ™ 7506 | EDAP | IFR 23 | IFR 10 | A1100 | Irganox ™ |
|---|---|---|---|---|---|---|---|
| Ex C1 | 80 | 20 | 50 | — | | — | 0.15 |
| Ex 8 | 80 | 20 | 50 | — | | 0.3 | 0.15 |

TABLE 7-continued

| | | | | | | |
|---|---|---|---|---|---|---|
| Ex 9 | 80 | 20 | 50 | — | 1 | 0.15 |
| Ex C13 | 80 | 20 | — | 50 | — | 0.15 |
| Ex C14 | 80 | 20 | — | 50 | 0.3 | 0.15 |
| Ex C15 | 80 | 20 | — | 50 | 1 | 0.15 |
| Ex C16 | 80 | 20 | — | 50 | — | 0.15 |
| Ex C17 | 80 | 20 | — | 50 | 0.3 | 0.15 |
| Ex C18 | 80 | 20 | — | 50 | 1 | 0.15 |

| Ex. No. Ingred. | Elvax™ 470 | Epsyn™ 7506 | P40 | IFR 24 | Exolit™ 422 | A1100 | Irganox™ 1010 |
|---|---|---|---|---|---|---|---|
| Ex C19 | 80 | 20 | 50 | — | 0 | 0 | 0.15 |
| Ex C20 | 80 | 20 | 50 | — | | 0.3 | 0.15 |
| Ex C21 | 80 | 20 | — | 50 | | — | 0.15 |
| Ex C22 | 80 | 20 | — | 50 | | 0.3 | 0.15 |
| Ex C23 | 80 | 20 | — | 50 | | 1 | 0.15 |
| Ex C24 | 80 | 20 | — | — | 50 | — | 0.15 |
| Ex C25 | 80 | 20 | — | — | 50 | 0.3 | 0.15 |
| Ex C26 | 80 | 20 | — | — | 50 | 1 | 0.15 |

TABLE 8

| Ex. No. Ingred | Elvax™ 470 | Epsyn™ 7506 | SOLEM 932 | DE83R | EVA85H | Irganox™ 1010 | A1100 | A151 | A174 | M8500 |
|---|---|---|---|---|---|---|---|---|---|---|
| Ex C27 | 80 | 20 | 60 | — | — | 0.15 | — | — | — | |
| Ex C28 | 80 | 20 | 60 | — | — | 0.15 | 0.3 | — | — | |
| Ex C29 | 80 | 20 | 60 | — | — | 0.15 | — | 0.3 | — | |
| Ex C30 | 80 | 20 | 60 | — | — | 0.15 | — | — | 0.3 | |
| Ex C31 | 80 | 20 | 60 | — | — | 0.15 | — | — | — | 0.3 |
| Ex C32 | 80 | 20 | — | 20 | 8 | 0.15 | — | — | — | |
| Ex C33 | 80 | 20 | — | 20 | 8 | 0.15 | 0.3 | — | — | |
| Ex C34 | 80 | 20 | — | 20 | 8 | 0.15 | — | 0.3 | — | |
| Ex C35 | 80 | 20 | — | 20 | 8 | 0.15 | — | — | 0.3 | — |
| Ex C36 | 80 | 20 | — | 20 | 8 | 0.15 | — | — | — | 0.3 |

COMPARATIVE EXAMPLES C37–C40 AND EXAMPLES 10–13

Compositions with a P-N type flame retardant and different matrix polymer materials were prepared and pressed into films. Table 9 shows these compositions and the legend states whether the matrix polymer is capable of forming hydrogen bonds.

FIG. 8 shows the tensile stress-strain curves for these blends. The polymeric materials that are capable of forming hydrogen bonds demonstrate greatly improved mechanical properties with the addition of aminofunctional silane, i.e., elimination of a yield point and higher tensile values. The polymeric materials that are not capable of forming hydrogen bonds do not show this type of improvement with addition of aminosilane. Reduced elongation is evident in all blends containing silane coupling agent. Without wishing to be limited by theory, it is believed that the amino functionality of the silane provides dramatic improvements in mechanical properties for polymeric matrices capable of forming hydrogen bonds.

The PVC films used widely in electrical tapes display excellent ambient stress-strain properties which can be an indication of the films handling behavior. Films of this invention have similar properties at room temperature, and also have superior low temperature stress-strain properties compared to PVC films.

Figure 9:
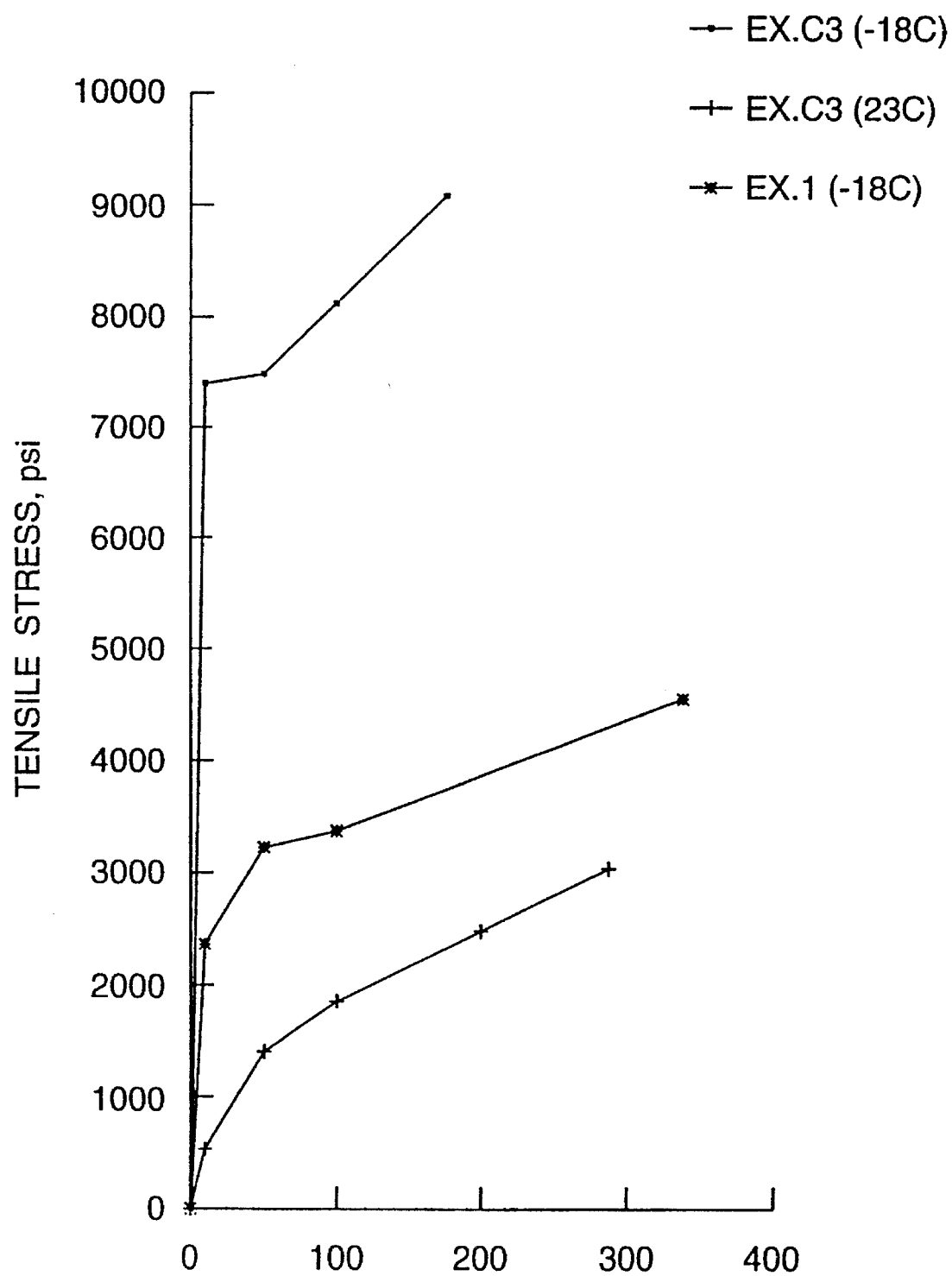
FIG. 9 shows the stress-strain curves at low temperatures of Example 1 of the invention and Comparative Example 3.

FIG. 9 shows ambient and low temperature stress-strain behavior for PVC film and low temperature stress-strain behavior for the material of Example 1. The shape of the Example 1 film shows no yield point and more closely resembles the ambient PVC behavior while the low temperature PVC curve has a yield point, very low elongation, and very high ultimate tensile strength. At low temperatures, films of this invention have handling characteristics superior to PVC.

TABLE 9

| Ex. No. Ingred. | Elvax™ 470 | Epsyn™ 7506 | EDAP | A1100 | Irganok™ 1010 | LDX 314[1] | Bynel™ 3048[1] | PP-PB[2,3] | LLDPE[2] | EVOH 27[1,4] | Surlyn 9020[2] |
|---|---|---|---|---|---|---|---|---|---|---|---|
| Ex 10 | 80 | 20 | 50 | 0 | 0.15 | 100 | — | — | — | — | — |
| Ex 11 | 80 | 20 | 50 | 1 | 0.15 | 100 | — | — | — | — | — |
| Ex 12 | 80 | 20 | 50 | 0 | 0.15 | — | 100 | — | — | — | — |
| Ex 13 | 80 | 20 | 50 | 1 | 0.15 | — | 100 | — | — | — | — |
| Ex C37 | 80 | 20 | 50 | 0 | 0.15 | — | — | 100 | — | — | — |
| Ex C38 | 80 | 20 | 50 | 1 | 0.15 | — | — | 100 | — | — | — |
| Ex C39 | 80 | 20 | 50 | 0 | 0.15 | — | — | — | 100 | — | — |
| Ex C40 | 80 | 20 | 50 | 1 | 0.15 | — | — | — | 100 | — | — |
| Ex C41 | 80 | 20 | 50 | 0 | 0.15 | — | — | — | — | 100 | — |
| Ex C42 | 80 | 20 | 50 | 1 | 0.15 | — | — | — | — | 100 | — |

TABLE 9-continued

| Ex. No. Ingred. | Elvax™ 470 | Epsyn™ 7506 | EDAP | A1100 | Irganok™ 1010 | LDX 314[1] | Bynel™ 3048[1] | PP-PB[2,3] | LLDPE[2] | EVOH 27[1,4] | Surlyn 9020[2] |
|---|---|---|---|---|---|---|---|---|---|---|---|
| Ex C43 | 80 | 20 | 50 | 0 | 0.15 | — | — | — | — | — | 100 |
| Ex C44 | 80 | 20 | 50 | 1 | 0.15 | — | — | — | — | — | 100 |

[1]Capable of forming H-bonds
[2]Not capable of forming H-bonds
[3]Not able to make films with this material; no mechanical integrity
[4]Not able to make films with this material; materials formed crosslinked thermoset

What is claimed is:

1. A halogen-free, electrically insulating film having a thickness of from about 150 μm to about 200 μm, said film comprising a resin component containing:
   a) from 0 to about 40 parts of a rubber selected from EP or EPDM rubber,
   b) correspondingly, from about 60 to about 100 parts of an ethylene vinyl acetate polymer,
   c) from about 40 parts to about 150 parts of ethylene diamine phosphate per 100 parts of said resin component, and
   d) from about 0.5 part to about 5 parts of an amino-functional silane coupling agent, per 100 parts of said resin component,
wherein a nonoriented film self-extinguishes in less than about 5 seconds, has an elongation at break of at least about 200%, a dielectric strength of at least about 1200 V/Mil, and stress-strain behavior such that a curve showing a first derivative of stress-strain is positive over the entire curve, and a curve showing a second derivative of stress-strain is negative over more than 50% of said curve.

2. A halogen-free electrically insulating film according to claim 1 wherein said ethylene diamine phosphate comprises from about 40 parts to about 80 parts, per 100 parts of said resin component.

3. A halogen-free electrically insulating film according to claim 1 wherein said amino-functional silane coupling agent is selected from the group consisting of N-beta-(amino-ethyl) gamma-aminopropyl trimethoxy silane and aminopropyl triethoxy silane and aminopropyl trimethoxy silane.

4. A halogen-free electrically insulating film according to claim 1 wherein said amino-functional silane coupling agent comprises from about 0.1 part to about 2 parts, per 100 parts of said resin component.

5. A halogen-free electrical tape backing having a thickness of from about 150 μm to about 200 μm, said backing comprising a resin component containing:
   a) from 0 to about 40 parts of a rubber selected from EP or EPDM rubber,
   b) correspondingly, from about 60 to about 100 parts of an ethylene vinyl acetate polymer,
   c) from about 40 parts to about 150 parts ethylene diamine phosphate, per 100 parts of said resin component, and
   d) from about 0.5 to about 5 parts of an amino-functional silane coupling agent per 100 parts resin component,
wherein a nonoriented film self-extinguishes in less than about 5 seconds, has an elongation at break of at least about 200%, a dielectric strength of at least about 1200 V/Mil, and stress-strain behavior such that a curve showing a first derivative of stress-strain is positive over the entire curve, and a curve showing a second derivative of stress-strain is negative over more than 50% of said curve.

6. A halogen-free electrical tape backing according to claim 5 wherein said ethylene diamine phosphate comprises from about 40 parts to about 80 parts, per 100 parts said resin component.

7. A halogen-free electrical tape backing according to claim 5 wherein said amino-functional silane is selected from the group consisting of N-beta-(amino-ethyl) gamma-aminopropyl trimethoxy silane and aminopropyl triethoxy silane and aminopropyl trimethoxy silane.

8. An electrical tape comprising an adhesive and a backing film having a thickness of from about 150 μm to about 200 μm, said backing film being halogen-free, said backing film comprising a resin component containing:
   a) from 0 to about 40 parts of a rubber selected from EP or EPDM rubber,
   b) correspondingly, from about 60 to about 100 parts of an ethylene vinyl acetate polymer, and
   c) from about 40 parts to about 150 parts ethylene diamine phosphate per 100 parts of said resin component, and
   d) from about 0.5 part to about 5 parts of an amino-functional silane coupling agent per 100 parts resin component,
said film being free of vinyl chloride, wherein a nonoriented film self-extinguishes in less than about 5 seconds, has an elongation at break of at least about 200%, a dielectric strength of at least about 1200 V/Mil, and stress-strain behavior such that a curve showing a first derivative of stress-strain is positive over the entire curve, and a curve showing a second derivative of stress-strain is negative over more than 50% of said curve.

9. An electrical tape having a halogen-free backing film according to claim 8 wherein said ethylene diamine phosphate comprises from about 40 parts to about 80 parts, per 100 parts said resin component.

10. A electrical tape having a halogen-free backing film according to claim 8 wherein said amino-functional silane coupling agent is selected from the group consisting of N-beta-(amino-ethyl) gamma-aminopropyl trimethoxy silane and aminopropyl triethoxy silane and aminopropyl trimethoxy silane.

11. An electrical tape having a halogen-free backing film according to claim 8 wherein said amino-functional silane coupling agent comprises from about 0.1 part to about 2 parts, per 100 parts said resin component.

* * * * *

UNITED STATES PATENT AND TRADEMARK OFFICE
CERTIFICATE OF CORRECTION

PATENT NO.: 5,498,476

DATED: March 12, 1996

INVENTOR(S): Pamela S. Tucker and Eumi Pyun

It is certified that error appears in the above-identified patent and that said Letters Patent is hereby corrected as shown below:

Column 4, Line 32, "well know" should read --well known--.

Column 5, Line 1, "stress-stain" should read --stress-strain--.

Column 10, Line 7, in Table 6, "H" should read --L97/H--.

Column 12, Table 9, "Irganok™" should read --Irganox™--.

Signed and Sealed this

Twentieth Day of May, 1997

Attest:

BRUCE LEHMAN

Attesting Officer

Commissioner of Patents and Trademarks